A. B. COLE.
BATTERY BOX.
APPLICATION FILED OCT. 5, 1914.

1,201,939.

Patented Oct. 17, 1916.

WITNESSES

INVENTOR
ARTHUR B. COLE
BY
his ATTORNEYS

UNITED STATES PATENT OFFICE.

ARTHUR B. COLE, OF CALDWELL, NEW JERSEY, ASSIGNOR TO THE MANHATTAN ELECTRICAL SUPPLY COMPANY, OF NEW YORK, N. Y., A CORPORATION OF NEW JERSEY.

BATTERY-BOX.

1,201,939.

Specification of Letters Patent. Patented Oct. 17, 1916.

Application filed October 5, 1914. Serial No. 365,099.

*To all whom it may concern:*

Be it known that I, ARTHUR B. COLE, a citizen of the United States of America, and residing at Caldwell, in the county of Essex and State of New Jersey, have invented a certain new and useful Improvement in Battery-Boxes, of which the following is a specification.

My invention relates to battery boxes and particularly to boxes designed to hold a group of ordinary dry batteries.

The object of my invention is to provide a receptacle having connections of such character that batteries of ordinary type may be used without any further change than the application of simple spring terminals thereto, and that upon the adjustment of the batteries in their receptacles in any relative rotary position the necessary connections are made when the box cover is closed.

Figures 1, 4, 5:
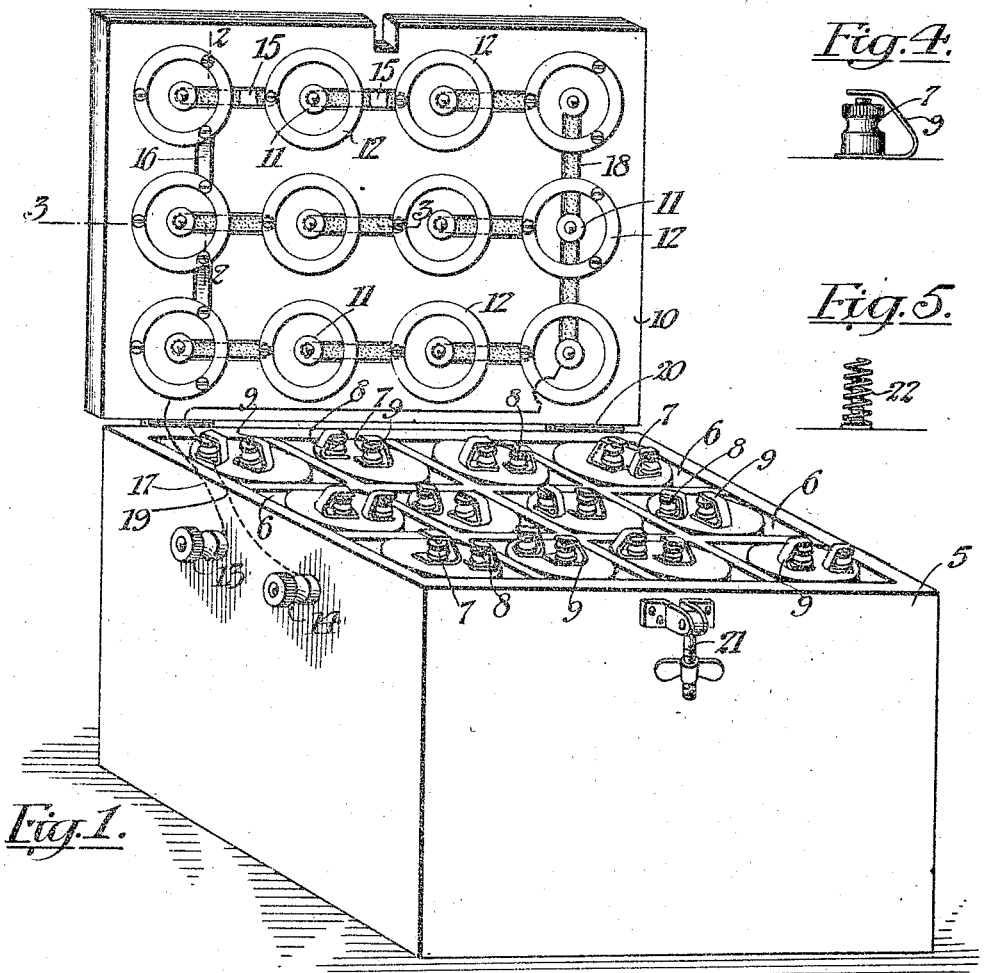
Figure 2:
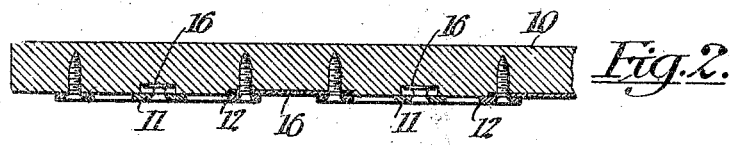
Figure 3:
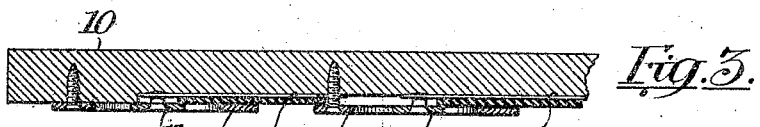

In the accompanying drawing, Figure 1 is a view in perspective of a battery box in which my invention is embodied in one form; Figs. 2 and 3 are partial cross sections through the cover of the box on the lines 2—2 and 3—3 respectively; and Figs. 4 and 5 are side elevations of battery terminals showing different forms of terminal springs.

Battery boxes of various types have heretofore been proposed for holding a group of batteries connected in multiple or in series. For most of these boxes however, the terminals of the battery must be specially shaped or the battery itself made of peculiar shape, and even under such conditions the batteries must be arranged in certain specific positions in the box, in order that the proper connections may be established.

In the construction here shown, I have provided a battery box 5 having pockets 6 of any suitable character in which the batteries may be placed and held in position. At each of the ordinary binding screw terminals 7 and 8 of the batteries, I attach a spring contact 9. Coöperating with these contacts I arrange on the cover 10 of the box a series of pairs of contacts 11 and 12, one of which (11) has the form of a disk which is engaged by the spring contact 9 on the center terminal 7 of the battery, while the other contact (12) has the form of a ring surrounding the disk 11 and engaged by the spring contact 9 on the side terminal 8 of the battery. These cover contacts may be connected in any suitable manner with the binding screws 13 and 14 of the box. As here shown, the batteries are arranged in three rows of four batteries each. In each row the corresponding contacts on the cover are connected in series by straps 15 let into the cover and bridging from one ring 12 to the adjacent center contact 11. At one end of the cover the ring contacts are connected together in multiple by straps 16 from one of which a connection 17 is led to the box binding screw 13. At the opposite end of the cover, the center contacts are connected in multiple by bridging straps 18 let into the cover, and a connection 19 established between the same and the binding screw 14 on the box.

When the cover 10 is swung open on its hinge 20, obviously all the connections are broken. When the cover is lowered however the contacts 11 and 12 thereon engage and depress the spring contacts 9 on the batteries and establish the circuit therethrough to the binding screws 13 and 14 on the box. A catch 21 engaging the cover holds the cover shut and insures a close contact between the contacts thereon and the spring contacts on the batteries.

Various types of spring contacts may be employed. Perhaps the simplest form is the bent spring type shown in Figs. 1 and 4, the base of which is apertured to fit over the binding screw stem and is held by turning down the binding screw. A coil spring 22 also serves the purpose and may be secured in like manner or be soldered in position, if preferred.

The present box affords a simple container for a group of batteries and is particularly advantageous by reason of the fact that no special battery construction is necessary. Moreover, the box is "fool proof" in the sense that it is unnecessary to place the batteries in any particular position in their respective pockets in order to insure the engagement between the battery terminals and the cover contacts. The ring contacts 12 engage with the spring contacts on the side terminals 8 of the batteries, in whatever relative rotary position the batteries may be placed in the pockets.

While the batteries shown are of the common cylindrical type, the invention may be applied equally well to batteries of rectangular shape. And various modifications to meet various conditions will readily suggest themselves.

I claim as my invention:—

1. A battery box of the type described comprising a box body and a cover therefor, means for supporting a series of batteries at predetermined points in the box body, terminals extending beyond the end face of each battery and coöperating terminals on the inner face of the box cover automatically engaging the battery terminals in the closed position of the cover whatever the relative rotary positions of the several batteries at their points of support in the box body.

2. A battery box of the type described comprising a body portion partitioned to form a plurality of open cells, batteries freely insertible in said cells, spring center and side terminals projecting beyond the outer end of each battery, in combination with a cover for said battery box, said cover having on its inner face, for each battery, a center contact and a surrounding ring contact, which contacts, on the closing of the cover, automatically engage the battery center and side terminals irrespective of the relative rotary position of the batteries in the cells of the box body.

In testimony whereof I have signed my name to this specification, in the presence of two subscribing witnesses.

ARTHUR B. COLE.

Witnesses:
RODNEY L. MARCHANT,
WILLIAM ABBE.